Jan. 16, 1962    J. S. ARNOLD ETAL    3,016,735
STRUCTURAL BOND EVALUATION
Filed June 17, 1958    4 Sheets-Sheet 1

INVENTORS
JAMES S. ARNOLD
AND JOSEPH A. KOCHLY
BY
ATTORNEYS

INVENTORS
JAMES S. ARNOLD
AND JOSEPH A. KOCHLY

Jan. 16, 1962 J. S. ARNOLD ETAL 3,016,735
STRUCTURAL BOND EVALUATION
Filed June 17, 1958 4 Sheets-Sheet 4

INVENTORS
JAMES S. ARNOLD
AND JOSEPH A. KOCHLY
BY
ATTORNEYS

United States Patent Office 3,016,735
Patented Jan. 16, 1962

3,016,735
STRUCTURAL BOND EVALUATION
James S. Arnold, Palo Alto, and Joseph A. Kochly, San Carlos, Calif., assignors to the United States of America as represented by the Secretary of the Air Force
Filed June 17, 1958, Ser. No. 742,694
1 Claim. (Cl. 73—67.1)

This invention relates to apparatus for nondestructively testing structural bonds, particularly structural adhesive bonds in honeycomb sandwich structures used in airplane manufacture.

The use of adhesive in the fabrication of metal and metal-plastic composite structures is a technique that has become very useful in many fields of design and manufacturing, particularly those related to aircraft. Also adhesives have become important in the fabrication of some nonmetal structures, e.g., joining glass cloth skins to glass mat waffle cores. The adhesive bond has unique characteristics that can be important to aircraft designers. Many factors affect the quality of adhesive bonds and a variety of destructive and nondestructive tests have been proposed and used in efforts to measure both qualities. Destructive tests on adhesive bonded samples are widely used. They determine bond quality by destroying the bonds thus making the part unusable. As a result the evaluation of usable bonds is based on statistical and process control variables—a procedure which is quite satisfactory in many applications. There exists, however, applications in which a direct indication of bond strength in usable assemblies is desired, particularly where such bonds are involved in the structural integrity of aircraft, e.g., honeycomb sandwich structure. In these instances the need for a nondestructive method of bond evaluation is obvious.

In U.S. patent application No. 493,843, filed by James S. Arnold, one of the co-applicants herein, on March 11, 1955, which application resulted in issuance of Patent No. 2,851,876 on Sept. 16, 1958 there are disclosed methods and apparatus for the evaluation of the strength of adhesion between two bonded surfaces of a laminated structure. The present invention resides in simplifying the apparatus of the previous invention, such simplification being accomplished in such manner as to preserve the accuracy of the evaluation obtained, and under certain conditions to improve the degree of accuracy.

The present invention also provides circuitry including a meter of the pointer-and-scale type, in contrast to the oscillographic type of indicator of the previous invention; said circuitry further including novel means for operating said meter.

In both inventions the condition-sensitive element is a transducer, usually a short solid cylinder of barium titanate. The transducer is an artificial piezoelectric material, polarized axially. Electrodes are provided on its plane surfaces, and the transducer is supplied with alternating current. When the frequency of the applied current is the same as the frequency of mechanical vibration of the transducer in one of its many possible modes, resonance occurs. This fact can be ascertained by measurement of transducer voltage (or current or impedance) as a function of frequency, and can be illustrated graphically as in FIGURE 3.

When a transducer, excited at resonance, is applied to a test specimen containing adhesive bonds, changes occur in the shape of the resonance curve. These changes are related to the effective mass and the loss (conversion of vibratory energy to heat) in the test specimen. The specific changes in the resonance curves of the transducer that result from loading by a test specimen are a change in amplitude and a change in the frequency at which the peak occurs. These two changes (amplitude and frequency) have been demonstrated to correlate with adhesive bond quality, and can thus be used as a nondestructive indication of quality in situations of known geometry and materials.

Other characteristics and objects of the invention will be apparent upon examination of the following description of one mode of practicing said invention, together with a description of means appropriate for execution of the described mode, which means are illustrated in the accompanying drawings, and likewise embody the invention.

In said drawings:

FIG. 8 illustrates a probe assembly corresponding to that shown in Patent No. 2,851,876, above referred to.

Figure 1:
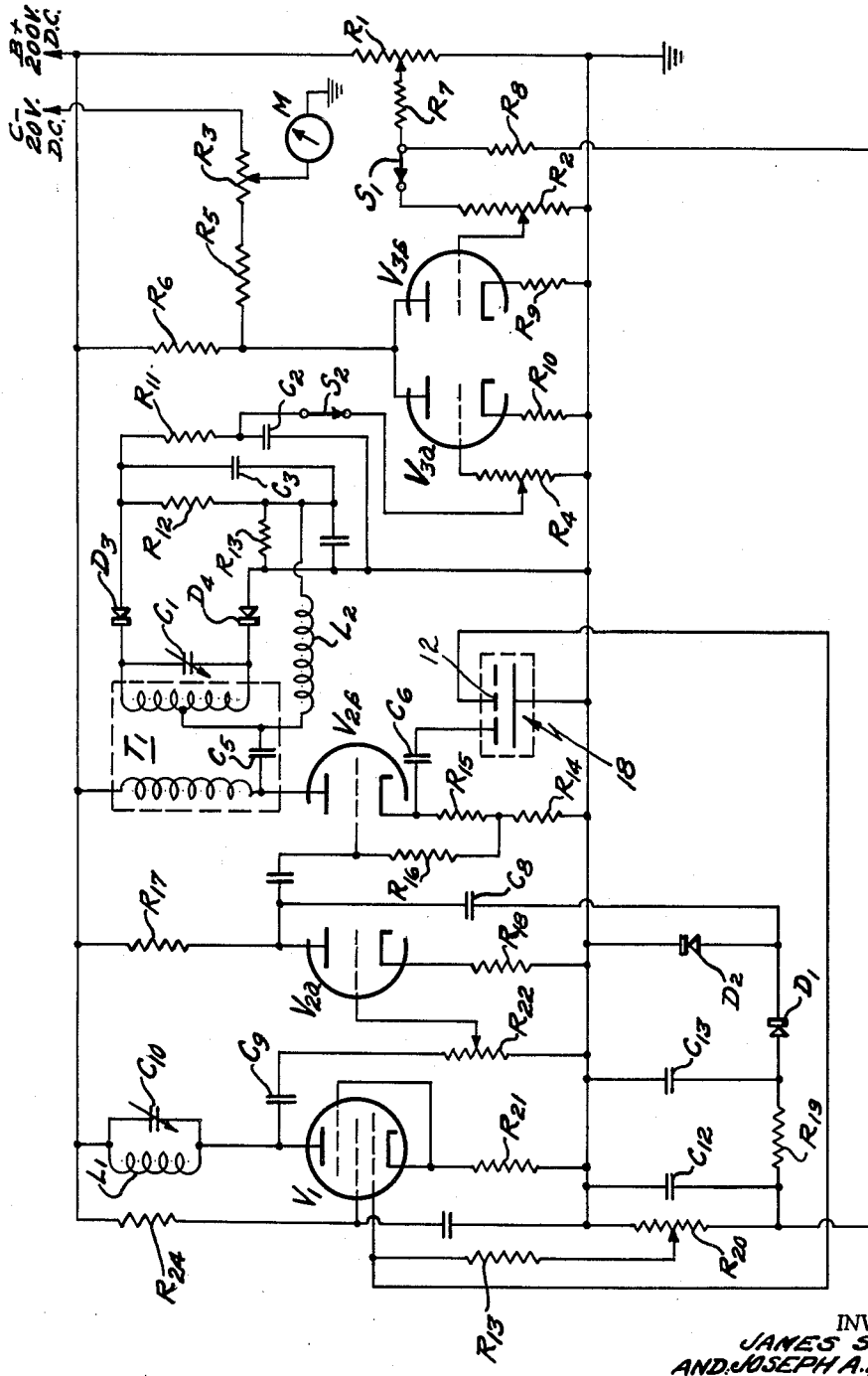
FIG. 1 is a schematic diagram of circuitry embodying the invention, and facilitating practice of the mode of measurement constituting one aspect of the invention.

The present invention, as illustrated in FIG. 1, is embodied in circuitry including a self-excited, transducer-controlled oscillator and associated components adapted to indicate the physical response of the transducer to the various vibration-inducing forces applied thereto, in the process of testing the strength of the adhesive bond under analysis. Two voltages, one related to amplitude and one related to frequency shift, are produced by the circuit. These voltages are combined, and the resulting sum read from a meter to indicate bond quality.

The two signals (frequency and amplitude) are thus converted to D.C. voltages that are combined in two triode amplifiers having a common plate circuit. A D.C. voltmeter with a suitable adjusting network in this plate circuit indicates the changes that take place when the transducer is loaded, and provides the visible indication of bond quality.

In the circuit of FIG. 1 the vacuum tubes $V_1$ and $V_2$ form the basic oscillator circuit. The transducer is driven by the cathode follower amplifier, $V_{2b}$. The feedback electrode 12 supplies the input signal for the control grid of the first amplifier, vacuum tube $V_1$. $V_1$ is a remote cut-off, variable gain tube, that receives a control bias (AGC) from a rectifier network ($D_1$ and $D_2$). Tube $V_1$ has a tuned plate circuit. The purpose of this circuit is to provide high plate impedance at the frequency at which the oscillator is to operate, and thus prevent possible oscillation in undesired modes ($F_1$ for example). The circuit tuning is not critical, and it affects the amplitude of the oscillation rather slowly. It does not control the frequency of oscillation, which depends upon the transducer.

The signal from which the AGC voltage is derived is the A.C. component of plate voltage at vacuum tube $V_{2a}$. The AGC action tends to maintain a constant signal level at this point, which demands a value of bias at the grid of $V_{2a}$ that is inversely proportional to the feedback signal derived from the transducer. The feedback voltage at the transducer depends upon the transducer loading (bond quality), hence the AGC bias that is developed becomes a measure of the feedback voltage and the transducer loading. The AGC voltage is applied through a resistance network ($R_2$ and $R_8$) to one grid of the output meter tube, $V_{3b}$.

The network that includes $T_1$, $D_3$, $D_4$, etc., is the frequency measuring portion of the circuit. It is a standard phase detector (discriminator) that produces a D.C. voltage when the impressed frequency differs from that to which it is tuned. This signal is applied through $R_4$ to the grid of the second output meter tube, $V_{3a}$. The two triodes of $V_3$ have a common plate circuit. A meter is operated from the plate circuit to indicate the combined effects of frequency and amplitude changes. The adjustment procedure requires two test samples, one a standard bond of the type to be evaluated, the other a sample of the outer member (skin) of the assembly. The following steps are required:

$S_1$ and $S_2$ open.—Adjust $R_3$ for meter zero. (Cancels zero-signal D.C. plate voltage from $V_3$.)

Close $S_2$, place probe on good bond, set $R_4$ at maximum. Adjust discriminator tuning ($C_1$) to give zero on meter. This adjusts the discriminator for zero output at the frequency that results when probe is loaded with a satisfactory bond.

*Place probe on skin sample.*—If meter reading is large, reduce it to about half scale by adjusting $R_4$. This adjusts the range of frequency shift for the particular samples to about half-scale on the instrument. In some classes of specimen very little frequency shift occurs, as in the case of metal honeycomb bonded with rigid adhesives. In cases where frequency shift is important, laminates bonded with rubbery adhesives for example, the frequency shift indication can be properly weighted to the specific samples by the use of $R_4$.

*Place probe on good bond, open $S_2$, close $S_1$, set $R_2$ to maximum.*—Adjust $R_1$ for meter zero. This adjusts the bucking voltage to give a zero meter reading for the value of AGC voltage that results from loading the transducer with a satisfactory bond.

*Place probe on skin sample.*—Adjust $R_2$ to produce about half-scale deflection on meter. This adjusts the range of amplitude change for the particular samples to about half-scale of the instrument.

*Close $S_2$.*—Instrument ready for use.

The above procedure adjusts the instrument for situations in which variations in both amplitude and frequency are expected from the bond conditions encountered, and weights the indication equally. Poorer bonds are indicated by larger meter deflections, good bonds by smaller (or zero) deflections. In situations in which the bond information is contained entirely in frequency shift, this parameter can be adjusted to full meter scale by means of $R_4$, and the amplitude information removed from the meter by opening $S_1$. If the amplitude information is known to be most useful, it can be expanded to full meter scale by means of $R_2$, and the frequency shift information removed by opening $S_2$.

*Transducers.*—The transducers that have been employed have been of specific aspect ratios to maximize the mechanical resonance characteristics, as described in section 2. This point is essential to effective operation of the system. Transducers of one inch diameter were ground to thickness corresponding to the preferred aspect ratios of 1.44 and 2.30. These aspect ratios are the ones at which the trajectories of modes $F_4$ and $F_6$ cross the "pure thickness mode" line (TT) in FIGURE 3.

Investigation of the transducer surface movement in these modes by means of a biaxial vibration pickup (subject of another invention disclosure) revealed that the center portions of the transducers vibrate with a comparatively large motion amplitude, and with the proper phase relationship to the rest of the transducer. This region was chosen for the location of the feedback electrode, to deliver a voltage comparable in magnitude to the driving voltage and 180° out of phase with it. These amplitude and phase relationships are essential to successful operation of the oscillator under the conditions of loading which will be encountered.

Figure 6:
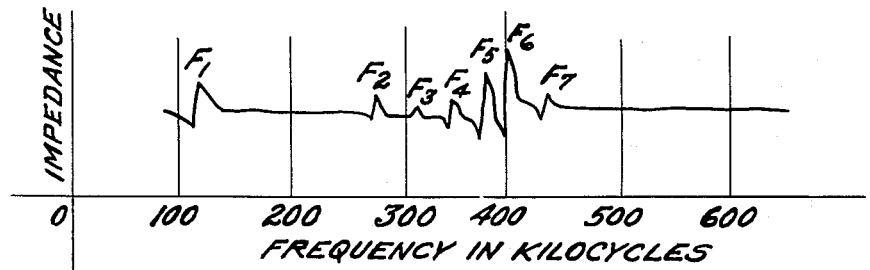
Figure 7:
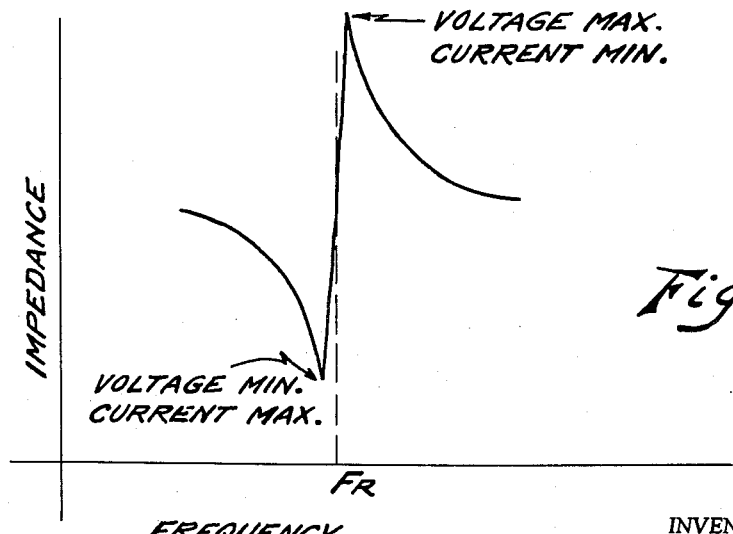

The electrical behavior of a typical cylindrical transducer with electrodes on the plane surfaces, when impedance is measured as a function of frequency, is illustrated in FIGURE 6. The sequence of resonance peaks constitutes a spectrum of resonances that is characteristic of the transducer geometry. The relative amplitudes and spacing in frequency are determined by the aspect ratio (radius/thickness) of the transducer, and the absolute frequencies are determined by the actual transducer dimensions. The effects of mechanical loading on a single electrical resonance peak are shown in FIGURE 7.

Figure 5:
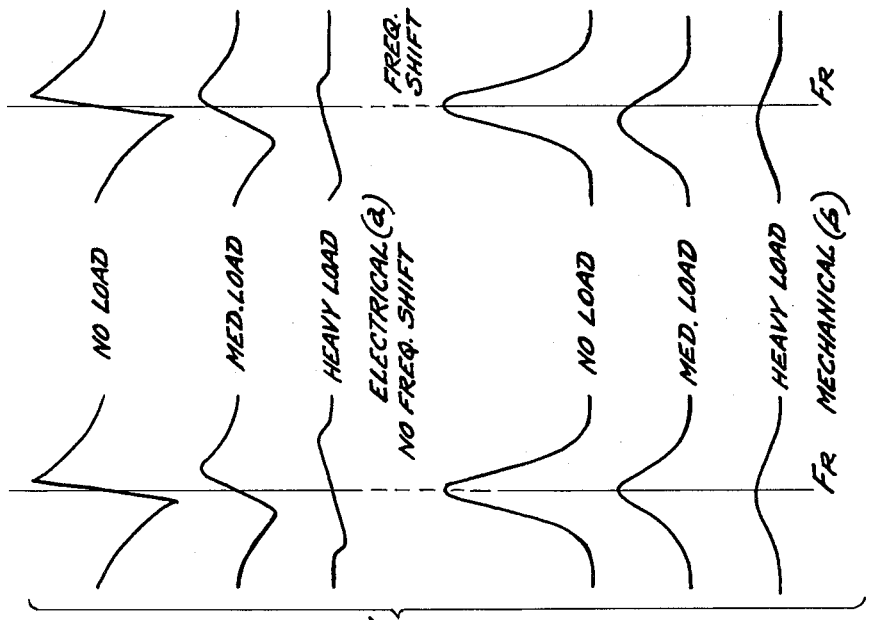
Figure 4:
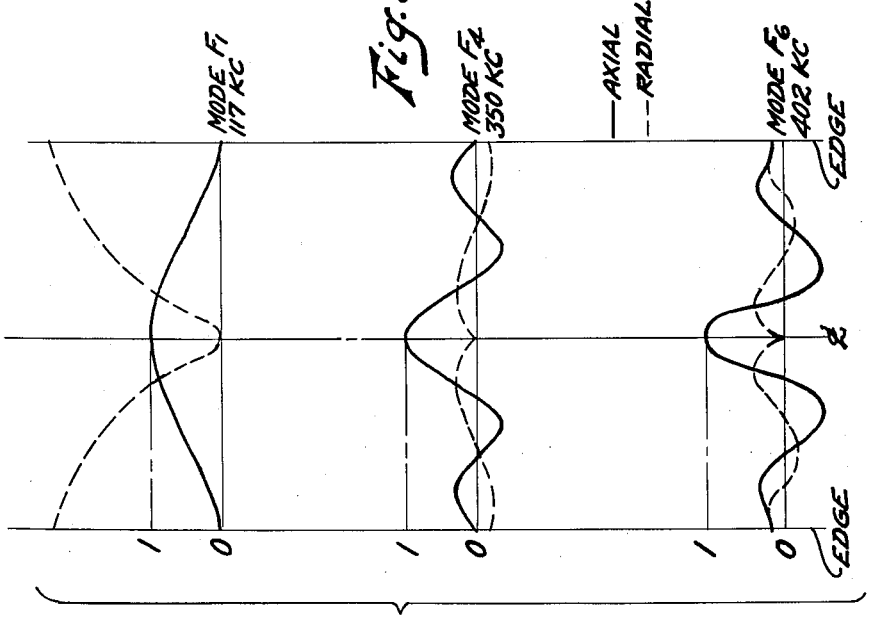

It is necessary also to describe the mechanical motion of the plane transducer surface. During the vibrating cycle, each point on the surface follows a particular trajectory. Experimental means have been developed for measurement of these trajectories, and the motion of the transducer surface in the various vibration modes has been ascertained. This motion is in general not uniform over the surface, but is wave-like without radial nodal lines, in the modes that are of interest. Both the phase and amplitude of the motion, with respect to the driving voltage, vary over the surface of the transducer. The behavior of the mechanical resonance (at the center of the transducer, for example) can be compared with the electrical behavior, as is shown in FIGURE 5. The relative amplitudes of motion at points along a disc radius are shown in FIGURE 4 for several vibration modes.

The relationsip between the mechanical and electrical aspects of transducer vibration has been investigated. Measurements made with isolated electrodes on the vibrating surface verify the presence of charges produced piezoelectrically by the transducer as it experiences dilation and compression during the vibration cycle. When a conducting electrode is applied to an entire plane surface, the charges developed by the transducer vibration induce circulating currents in the electrode, and the net voltage that appears on the conducting surface results from the superposition of elementary charges from the various areas of the transducer. The amplitudes and phase angles of these elementary induced charges depend upon the distribution and phase of the mechanical motion, and it is the vector (or more properly, phasor) sum of these components that determines the electrical impedance of the transducer near resonance. This behavior suggests the possibility that large mechanical motion may be possible with small electrical indication, because the vector sum of the piezoelectrically produced charges may be small. There is the possibility of small mechanical amplitudes with comparatively large electrical indications. Both of these situations have been observed, and it can be stated that no simple relationship has been found between the electrical and mechanical amplitudes of the transducer resonances. It has been demonstrated that the use of an electrode that is isolated from the driving voltage will develop a charge that is proportional to the average amplitude of the transducer motion in the area to which it is applied. Curves of mechanical amplitude as a function of frequency, such as are shown in FIGURE 5, thus can also be derived electrically by the use of an isolated electrode at the point of measurement.

Figure 3:
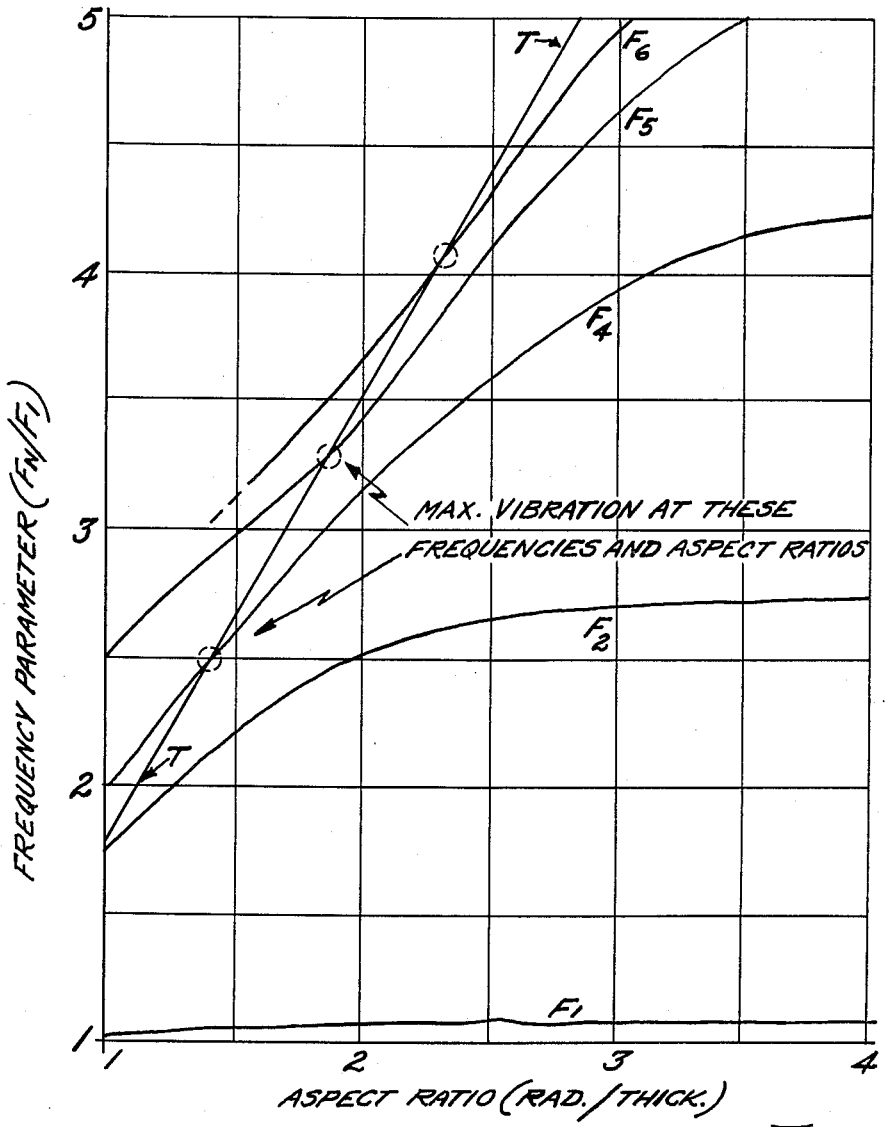
FIGS. 3 to 7 incl. are graphs showing electrical relationships developed during use of the invention.
Figure 2:
FIG. 2 is a view of two adhesively bonded elements, constituting subject matter for analysis by the mode of bond evaluation disclosed herein.

Experiments have been performed to determine the changes in the resonance spectra of transducers that occur as a function of aspect ratio. Repeated measurements of resonance frequencies were made as a transducer was reduced in thickness, and the results were plotted. FIGURE 3 is indicative of the results, showing a few of the curves obtained. Lines $F_1$, $F_2$, $F_4$, etc., on the graph represent the frequencies of particular vibration modes, and are termed mode trajectories. The line TT represents the "pure thickness" vibration frequency that would be found, if such a mode existed. The line TT was calculated on the basis of the standard acoustic velocity in barium titanate. It is to be noted that the real mode trajectories cross TT as the aspect ratio increases, changing slope, and indicating a tendency for the vibration mode to persist near the half wave thickness resonance (TT). It has also been found that the amplitudes, both electrical and mechanical, that are associated with a given vibration mode are a maximum at the aspect ratio at which the mode trajectory intersects TT. The relative mode amplitude may be increased several hundred percent, by choice of aspect ratio, to provide operation at one of these preferred intersection points.

Figure 8:
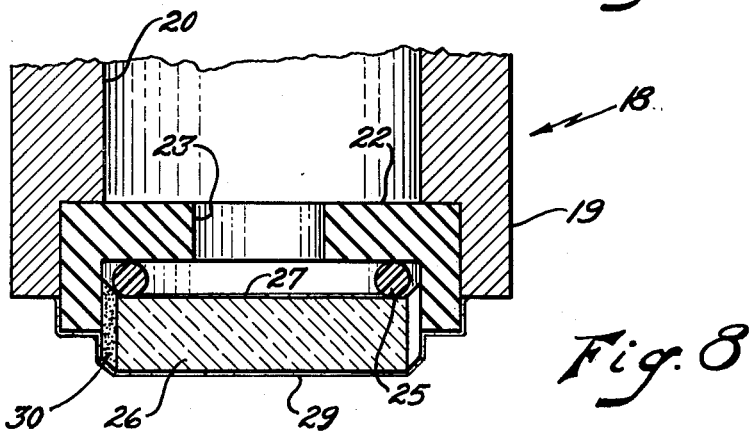

FIG. 8 illustrates a suitable construction for the probe assembly 18, the illustrated structure being reproduced from U.S. patent application No. 493,843, now Patent No. 2,851,876, above referred to. It includes a cylindrical body 19 of brass or the like, a polystyrene insulator 22, a neoprene O-ring gasket 25, and a barium titanate transducer 26 having an inner conductive coating 27 and an outer conductive coating 29, the latter extending outwardly to the lower surface of body 19. Flexible adhesive 30 holds the transducer 26 in place.

What we claim is:

In circuitry for evaluating a physical characteristic of a structure to be tested, the combination, of a piezoelectric transducer mounted on said structure, said transducer having a plurality of electrodes on the surface opposite the structure-contacting surface, current amplifying means having its output electrically connected to one of said transducer electrodes, a control circuit including another of said transducer electrodes, means for utilizing said control circuit to feed energy back to said amplifying means, to control the gain factor, said utilizing means including an AGC circuit for impressing upon said amplifying means a gain controlling biasing voltage that is in direct proportion to the physical characteristics of the load being applied to said transducer by the structure undergoing test, means including a pair of monitoring amplifiers having a common plate circuit, one of said monitoring amplifiers having its control grid responsive to a first D.C. voltage representative of the frequency shift pattern manifested in said first-named amplifying means, the other of said monitoring amplifiers having its control grid responsive to a second D.C. voltage representative of the voltage level manifested in said control circuit as said transducer converts said applied physical forces into electrical energy, and means in said common plate circuit for indicating the magnitude of the physical characteristic to be evaluated, in terms of the sum of said first and second D.C. voltages.

References Cited in the file of this patent

UNITED STATES PATENTS

| | | |
|---|---|---|
| 2,799,787 | Guttner et al. | July 16, 1957 |
| 2,846,874 | Horn | Aug. 12, 1958 |
| 2,881,390 | Winn | Apr. 7, 1959 |
| 2,937,640 | Bastir | May 24, 1960 |